US008847532B2

(12) United States Patent
Miyazaki et al.

(10) Patent No.: US 8,847,532 B2
(45) Date of Patent: Sep. 30, 2014

(54) ELECTRIC TOOL

(75) Inventors: Hiroshi Miyazaki, Shiga (JP); Hidenori Shimizu, Shiga (JP); Akira Kawai, Shiga (JP); Masaaki Okada, Shiga (JP)

(73) Assignee: Panasonic Corporation, Osaka (JP)

( * ) Notice: Subject to any disclaimer, the term of this patent is extended or adjusted under 35 U.S.C. 154(b) by 160 days.

(21) Appl. No.: 13/583,440

(22) PCT Filed: Mar. 16, 2011

(86) PCT No.: PCT/JP2011/056231
§ 371 (c)(1),
(2), (4) Date: Oct. 3, 2012

(87) PCT Pub. No.: WO2011/118475
PCT Pub. Date: Sep. 29, 2011

(65) Prior Publication Data

US 2013/0015789 A1 Jan. 17, 2013

(30) Foreign Application Priority Data

Mar. 26, 2010 (JP) ................................ 2010-073630

(51) Int. Cl.
*H02P 1/42* (2006.01)
*B25F 5/00* (2006.01)
*H02J 7/00* (2006.01)

(52) U.S. Cl.
USPC ........... 318/430; 318/560; 318/561; 388/937; 320/114; 320/116; 429/62

(58) Field of Classification Search
USPC ........... 318/430, 560, 561; 388/937; 320/114, 320/116, 106, 135; 429/62
See application file for complete search history.

(56) References Cited

U.S. PATENT DOCUMENTS 5,945,803 A * 8/1999 Brotto et al. .................. 320/106
7,270,910 B2 * 9/2007 Yahnker et al. ................. 429/62
7,508,171 B2 * 3/2009 Carrier et al. ................. 320/138

(Continued)

FOREIGN PATENT DOCUMENTS

JP 59-169387 A 9/1984
JP 10-003895 A 1/1998

(Continued)

OTHER PUBLICATIONS

International Search Report for corresponding International Application No. PCT/JP2011/056231 mailed Jun. 14, 2011.

(Continued)

*Primary Examiner* — Paul Ip
(74) *Attorney, Agent, or Firm* — Renner, Otto, Boisselle & Sklar, LLP

(57) ABSTRACT

An electric tool comprises a removable battery pack 2 as a power supply, a motor M as a power source, a drive unit being driven by said motor, a switch SW as an operation input unit, and a control circuit CPU controlling the driving of said motor according to the operation of said switch. The electric tool further comprises a power supply connection unit that enables a plurality of battery pack types, which have different rated output voltages, to be selectively connected, and an identification means that identifies the type of said battery pack that has been connected. Said control circuit is configured to control an output of said motor based on identification information for the type of said battery pack that has been connected, provided by said identification means.

8 Claims, 7 Drawing Sheets

(56) References Cited

U.S. PATENT DOCUMENTS

| | | | | |
|---|---|---|---|---|
| 7,564,216 | B2 * | 7/2009 | Carrier et al. | 320/116 |
| 7,688,028 | B2 * | 3/2010 | Phillips et al. | 320/114 |
| 7,719,234 | B2 * | 5/2010 | Carrier et al. | 320/135 |
| 7,723,952 | B2 * | 5/2010 | Phillips et al. | 320/114 |
| 7,728,553 | B2 * | 6/2010 | Carrier et al. | 320/119 |
| 7,868,591 | B2 * | 1/2011 | Phillips et al. | 320/114 |
| 8,653,787 | B2 * | 2/2014 | Cunanan et al. | 320/106 |
| 2005/0073282 | A1 * | 4/2005 | Carrier et al. | 320/106 |
| 2005/0077878 | A1 * | 4/2005 | Carrier et al. | 320/134 |
| 2005/0202310 | A1 * | 9/2005 | Yahnker et al. | 429/62 |
| 2006/0087283 | A1 * | 4/2006 | Phillips et al. | 320/114 |
| 2006/0087284 | A1 * | 4/2006 | Phillips et al. | 320/114 |
| 2006/0087285 | A1 * | 4/2006 | Phillips et al. | 320/114 |
| 2006/0087286 | A1 * | 4/2006 | Phillips et al. | 320/114 |
| 2007/0128505 | A9 * | 6/2007 | Yahnker et al. | 429/62 |
| 2008/0003491 | A1 * | 1/2008 | Yahnker et al. | 429/62 |
| 2008/0180059 | A1 * | 7/2008 | Carrier et al. | 320/112 |
| 2008/0309285 | A1 * | 12/2008 | Choksi et al. | 320/106 |
| 2010/0141207 | A1 * | 6/2010 | Phillips et al. | 320/114 |
| 2011/0248669 | A1 * | 10/2011 | Cunanan et al. | 320/106 |

FOREIGN PATENT DOCUMENTS

| | | | |
|---|---|---|---|
| JP | 10-027630 | A | 1/1998 |
| JP | 2002-027675 | A | 1/2002 |
| JP | 2002-305037 | A | 10/2002 |
| JP | 2003-200363 | A | 7/2003 |
| JP | 2006-247821 | A | 9/2006 |

OTHER PUBLICATIONS

Form PCT/ISA/237 for corresponding International Application No. PCT/JP2011/056231 dated Jun. 14, 2011.

* cited by examiner

ELECTRIC TOOL

TECHNICAL FIELD

The invention relates generally to electric tools and, more particularly, to an electric tool comprising a removable battery pack as a power supply.

BACKGROUND ART

Generally, an electric tool comprises a motor that has an output appropriate for the intended use. Then, when the electric tool comprises a removable battery pack as a power supply, the battery pack has a voltage and a capacity corresponding to the output of the motor. For this reason, when there are several different types of electric tools, it means that there are also several different types of battery packs that have voltages and capacities corresponding to the several different types of electric tools, respectively.

In regard to these several different types of battery packs, Japanese Patent Application Laid-Open No. 2002-027675 discloses an electric tool which is configured to be able to use a battery pack under some conditions with relation to a voltage, even if the battery pack is not the proper corresponding battery pack.

In the above document, when a proper battery pack corresponding to an electric tool has a rated output voltage of "A" and other battery packs have a rated output voltage of "A" or less, these other battery packs can be also connected to the electric tool and can be also used.

Then, the electric tool can not use an upper battery pack that has a higher rated output voltage than the proper battery pack, and this is desirable from a safety standpoint. However, when the proper battery pack has been used up and there is only an upper battery pack around and a user wishes to work using the upper battery pack for only a short time, the electric tool can not meet the user's demand.

As a matter of course, if the electric tool is configured so as to be able to likewise use the upper battery pack, the electric tool can meet the user's demand. However, when the upper battery pack has been connected and used for a long time, the motor may break down easily due to the temperature rise, or the user may feel uncomfortable due to the temperature rise of the tool or may burn his hand with the tool.

DISCLOSURE OF THE INVENTION

It is an object of the present invention to provide an electric tool, which can improve the convenience through increase in the scope of available battery packs, and can also ensure the safety.

An electric tool of the present invention comprises: a removable battery pack as a power supply; a motor as a power source; a drive unit being driven by said motor; a switch as an operation input unit; and a control circuit controlling the driving of said motor according to the operation of said switch, and wherein the electric tool comprises: a power supply connection unit that enables a plurality of battery pack types, which have different rated output voltages, to be selectively connected; and an identification means that identifies the type of said battery pack that has been connected, and wherein said control circuit is configured to control an output of said motor based on identification information for the type of said battery pack that has been connected, provided by said identification means.

In this configuration, since said control circuit is configured to control the output of said motor based on identification information for the type of said battery pack that has been connected, provided by said identification means, the electric tool can also use a battery pack that has a higher rated output voltage than a proper matching battery pack. Furthermore, the electric tool can avoid the probability that the temperature of said motor rises above an acceptable value through the connection of the battery pack having the higher rated output voltage. Then, because the plurality of battery pack types, having different rated output voltages, can be used, the electric tool can improve the convenience, and can also maintain high safety and endurance.

Preferably, said control circuit is configured not to limit the output of said motor, when the identification information for the type of said battery pack that has been connected denotes a low-voltage type, and wherein said control circuit is configured to limit the output of said motor, when the identification information for the type of said battery pack that has been connected denotes a high-voltage type.

At this time, preferably, the electric tool further comprises a load detection means that detects a load of said motor, and wherein said control circuit is configured to limit the output of said motor, when the identification information for the type of said battery pack that has been connected denotes a high-voltage type and a high-load is detected by said load detection means. Furthermore, preferably, said control circuit is configured to limit the output of said motor, that is provided when the high-load is detected, to the output of said motor, that is provided when the identification information for the type of said battery pack that has been connected denotes the low-voltage type.

Preferably, said control circuit is configured to limit a rotating speed of said motor to a predetermined value or less when the identification information for the type of said battery pack that has been connected denotes a high-voltage type.

Preferably, said motor is a brushless motor, and wherein said control circuit is configured to limit the output of said motor by means of changing at least one of an overlapping conduction angle and an advance angle upon drive of said motor.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
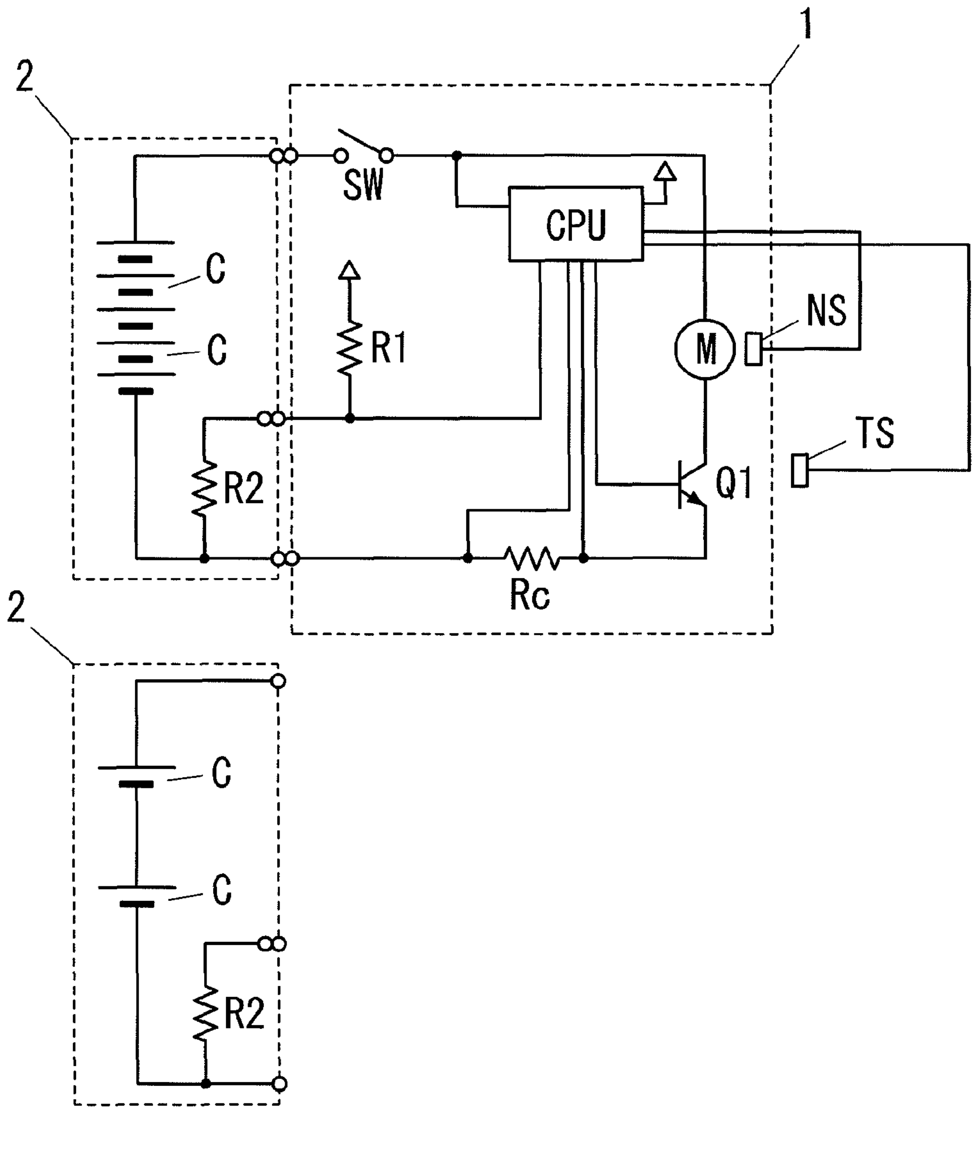
FIG. 1 is a block circuit diagram showing an electric tool according to an embodiment of the present invention.

An embodiment of the present invention will be described below. An electric tool comprises a main unit 1 that has a motor M built-in as a power source, and a removable battery pack 2 as a power supply, and then operates (see FIG. 1). The electric tool further comprises a control circuit CPU that controls the driving of motor M, a switching element Q1 for the driving, a rotating speed sensor NS, and a temperature sensor TS. Temperature sensor TS is located near switching element Q1 and motor M.

Control circuit CPU obtains rotating speed information from rotating speed sensor NS, and obtains temperature information from temperature sensor TS, and detects a load of motor M from a voltage between both ends of a current sensing resistor Rc, as a load current value. Then, control circuit CPU is configured to detect identification information for the type of battery pack 2 that has been connected, and a battery voltage on-load.

In regard to battery pack 2, there is a plurality of battery pack types, each of which has a plurality of cells C connected in series built-in and can be connected to the same connection terminal in main unit 1, and supplies the power to main unit 1. Then, each of battery packs 2 has a different number of cells C, and then comprises a resistor R2 that has a resistance value corresponding to the number of cells C (the number of series connections). When a battery pack 2 is connected to main unit 1, control circuit CPU in main unit 1 is configured to identify the type of the battery pack 2 that has been connected, having a different number of cells C, through a partial resistance provided by a resistor R1 and the above resistor 2. In regard to the identification through a voltage value's difference of the battery pack 2, an identification code corresponding to each type of battery packs 2 may be written in a non-volatile memory located in battery pack 2. Then, when a battery pack 2 is connected to main unit 1, control circuit CPU that also functions as an identification means for identifying a battery voltage type may perform the identification by means of reading out the abovementioned identification code.

As explained above, in regard to battery pack 2, there is a plurality of battery pack types, each of which has a different number of cells C. Then, when any of battery packs 2 is connected to main unit 1, control circuit CPU rotates motor M through driving switching element Q1 according to the operation of a trigger switch SW, and thereby a user can work using the electric tool. Then, when a battery pack 2 having a rated output voltage, being set in accordance with the characteristics of motor M, or a battery pack 2 having a lower rated output voltage than this battery pack 2 is connected to main unit 1, control circuit CPU drives motor M with a normal control.

Meanwhile, when a battery pack 2 having a rated output voltage higher than the above rated output voltage being set in accordance with the characteristics of motor M is connected to main unit 1, control circuit CPU detects this matter through the abovementioned identification information and then performs output limitation of motor M based on PWM control.

Figure 2:
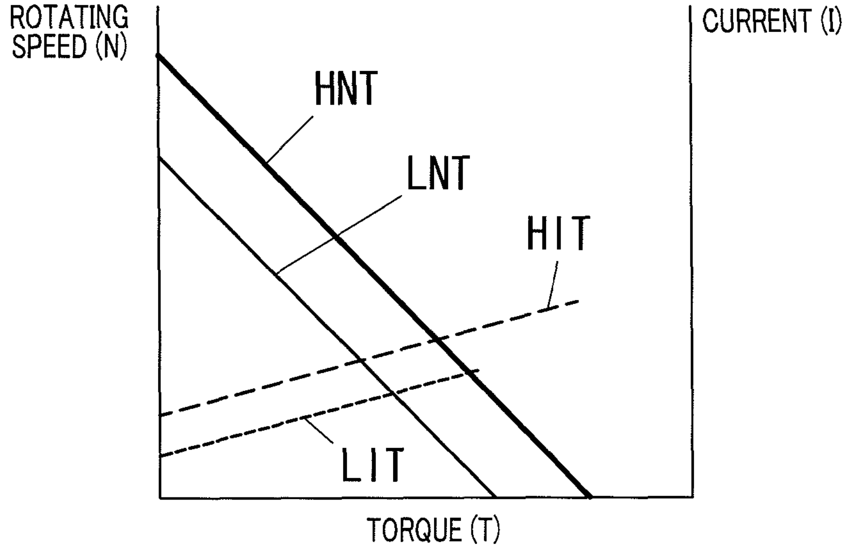
FIG. 2 is an explanatory diagram showing NT characteristics and IT characteristics of a motor.

FIG. 2 shows a torque and a rotating speed (NT) characteristics, and a current and a torque (IT) characteristics of motor M. In the figure, HNT denotes NT characteristics obtained upon the driving at a high-voltage, and HIT denotes IT characteristics obtained upon the driving at a high-voltage. Then, LNT denotes NT characteristics obtained upon the driving at a low-voltage, and LIT denotes IT characteristics obtained upon the driving at a low-voltage. The torque and the rotating speed obtained upon the driving at a high-voltage become larger than the torque and the rotating speed obtained upon the driving at a low-voltage, but the result increases not only the output but also heat release.

Therefore, the structures of motor M and a drive part are required to be designed so as to endure a high voltage if usual. However, that may invite increasing sizes of main unit 1. So, in the electric tool of the present embodiment, when a battery pack 2 of a high-voltage type is connected, an average of input voltages is controlled, through PWM control, so as to become the same as an input voltage provided at a time when a battery pack 2 of a proper voltage type is connected.

Figure 3:
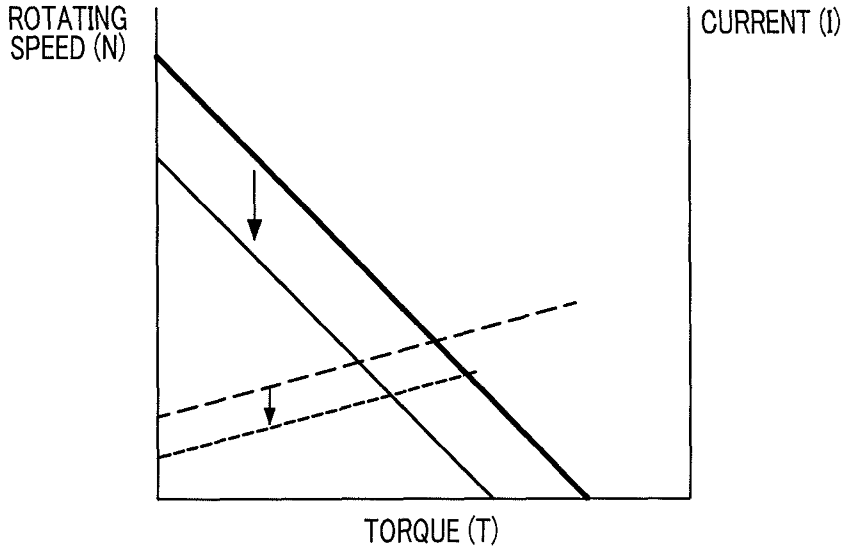
FIG. 3 is an explanatory diagram showing NT characteristics and IT characteristics when a control circuit according to said embodiment of the present invention performs one example of output limitation.

Specifically, control circuit CPU obtains the identification information of battery pack 2 and measures a motor current and a battery voltage. Then, control circuit CPU does not perform any specific limitation, when a battery pack 2 of a low-voltage type (that is, a proper battery pack 2 and a battery pack 2 having a lower rated output voltage than the proper battery pack 2) is being connected to main unit 1. Then, control circuit CPU performs PWM control so that the output is close to a maximum output obtained upon the connection of battery pack 2 of the low-voltage type, when a battery pack 2 of a high-voltage type (that is, a battery pack 2 having a higher rated output voltage than the proper battery pack 2) is being connected to main unit 1. Thereby, as shown in FIG. 3, NT characteristics and IT characteristics are limited to LNT and LIT shown in FIG. 2, respectively.

Then, a table that expresses a relationship between a voltage and a current is previously stored in control circuit CPU. Then, based on this table, control circuit CPU determines where the present status is in NT characteristics and IT characteristics, and then control circuit CPU controls a current corresponding to a voltage through PWM control and thereby can add the limitation as explained above. Alternatively, a table that expresses a relationship between a rotating speed and a current may be previously stored in control circuit CPU. Then, based on this table, control circuit CPU may determine where the present status is in NT characteristics and IT characteristics, and then control circuit CPU may control a current corresponding to a rotating speed through PWM control and thereby can add the limitation as explained above. Alternatively, control circuit CPU may refer to temperature information to perform the above limitation only when the temperature exceeds a predetermined value.

In addition, control circuit CPU may be configured to perform PWM control so that the present heat release is equal to a heat release provided upon the connection of a battery pack 2 of a low-voltage type, based on a detected motor current, or control circuit CPU may be configured to perform PWM control so that the present output torque is equal to an output torque provided upon the connection of a battery pack 2 of a low-voltage type. If it is important to inhibit the heat release, the former is preferable. If it is important to reduce a torque and to inhibit a stress of the drive part, the latter is preferable.

Figure 4:
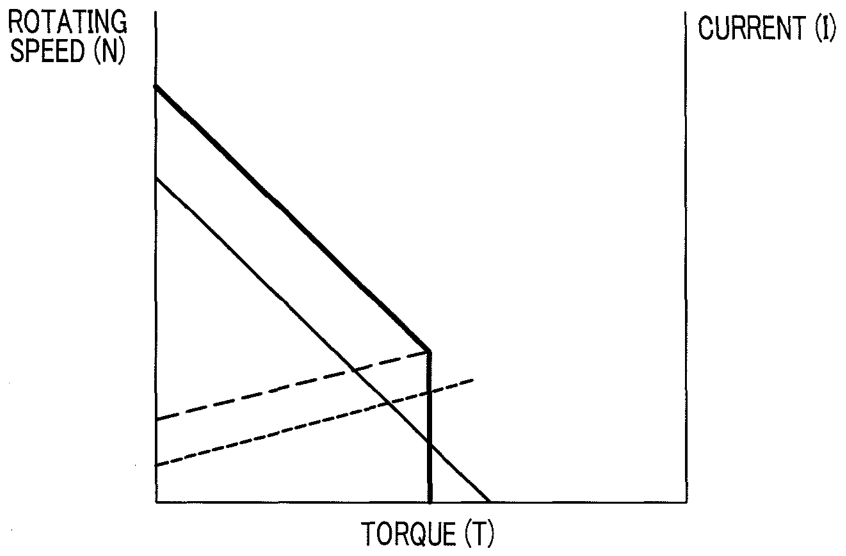
FIG. 4 is an explanatory diagram showing NT characteristics and IT characteristics when said control circuit according to said embodiment of the present invention performs another example of output limitation.
Figure 5:
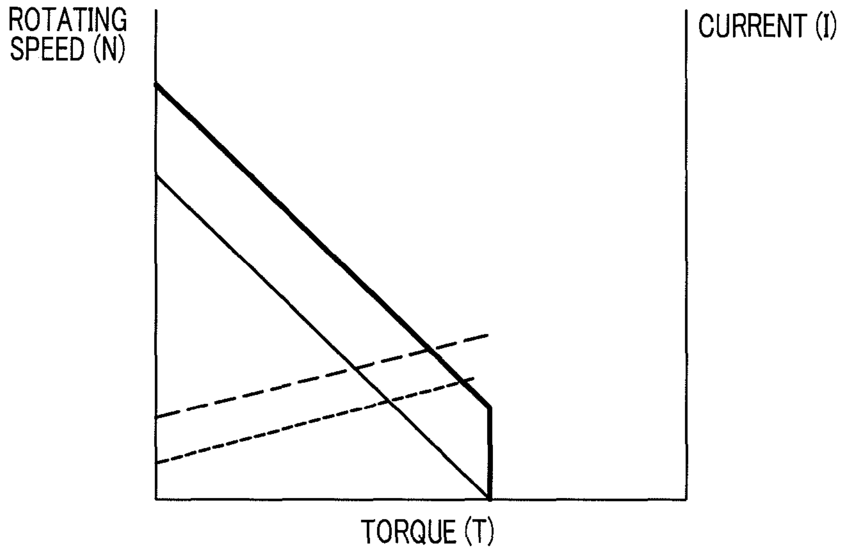
FIG. 5 is an explanatory diagram showing NT characteristics and IT characteristics when said control circuit according to said embodiment of the present invention performs yet another example of output limitation.

FIG. 4 shows a case where control circuit CPU has limited the output (has limited an upper limit of a load current) to inhibit heat release caused by a high load. FIG. 5 shows a case where control circuit CPU has limited the output (has limited an upper limit of a torque) to inhibit a torque.

Moreover, when a battery pack 2 of a high-voltage type is connected to main unit 1 and a high-voltage is applied to motor M, control circuit CPU may be configured to control an upper limit of a rotating speed in order to reduce the noise and burning of a rotational axis caused by high rotation.

In regard to limitation of a rotating speed, a table that expresses a relationship between a voltage and a current is previously stored in control circuit CPU, and then, based on this table, control circuit CPU determines where the present status is in NT characteristics and IT characteristics, and control circuit CPU controls a current corresponding to a voltage through PWM control, and thereby the above limitation is performed. Alternatively, a table that expresses a relationship between a rotating speed and a current is previously stored in control circuit CPU, and then, based on this table, control circuit CPU determines where the present status is in NT characteristics and IT characteristics, and then control circuit CPU controls a current corresponding to a rotating speed through PWM control, and thereby the above limitation is performed.

Figure 6:
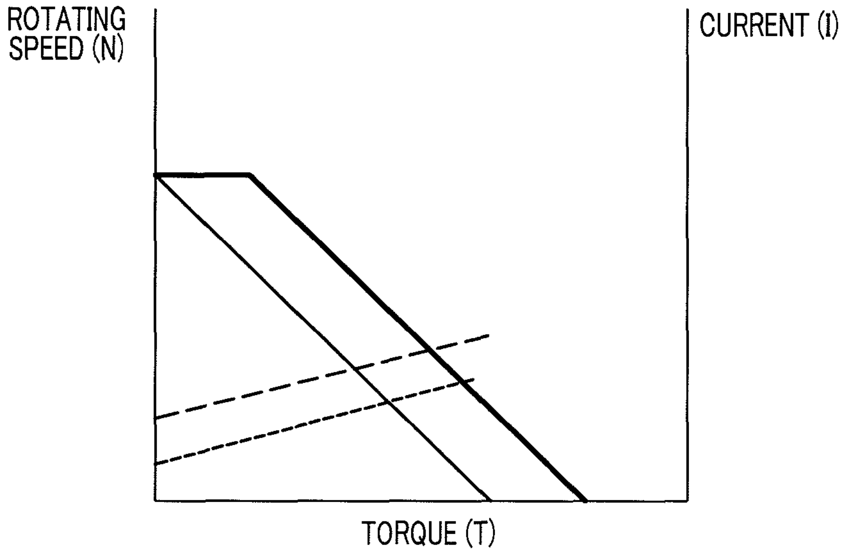
FIG. 6 is an explanatory diagram showing NT characteristics and IT characteristics when said control circuit according to said embodiment of the present invention performs yet another example of output limitation.

In addition, control circuit CPU may measure only a rotating speed, and then may be configured to limit the rotating speed through PWM control so that the rotating speed does not exceed a predetermined rotating speed. FIG. 6 shows a case where a maximum rotating speed has been reduced.

When motor M is not a brush motor but a brushless motor, control circuit CPU may be configured to limit the output with the following control.

Figure 7A:
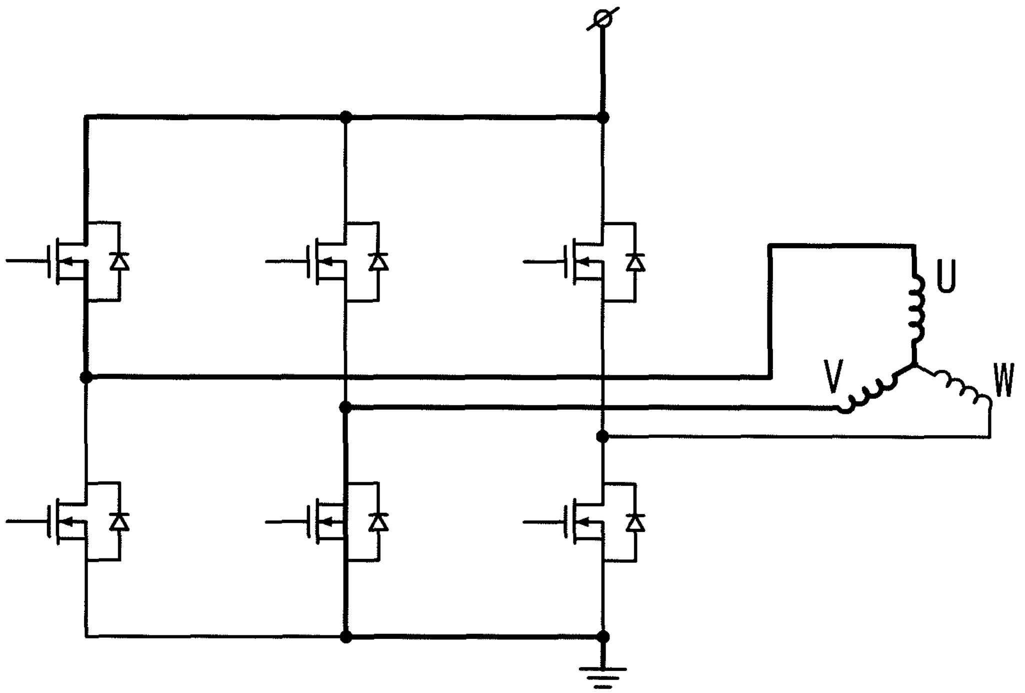
FIG. 7A is a circuit diagram showing a 120° conduction of a 3-phase brushless motor.
Figure 7B:
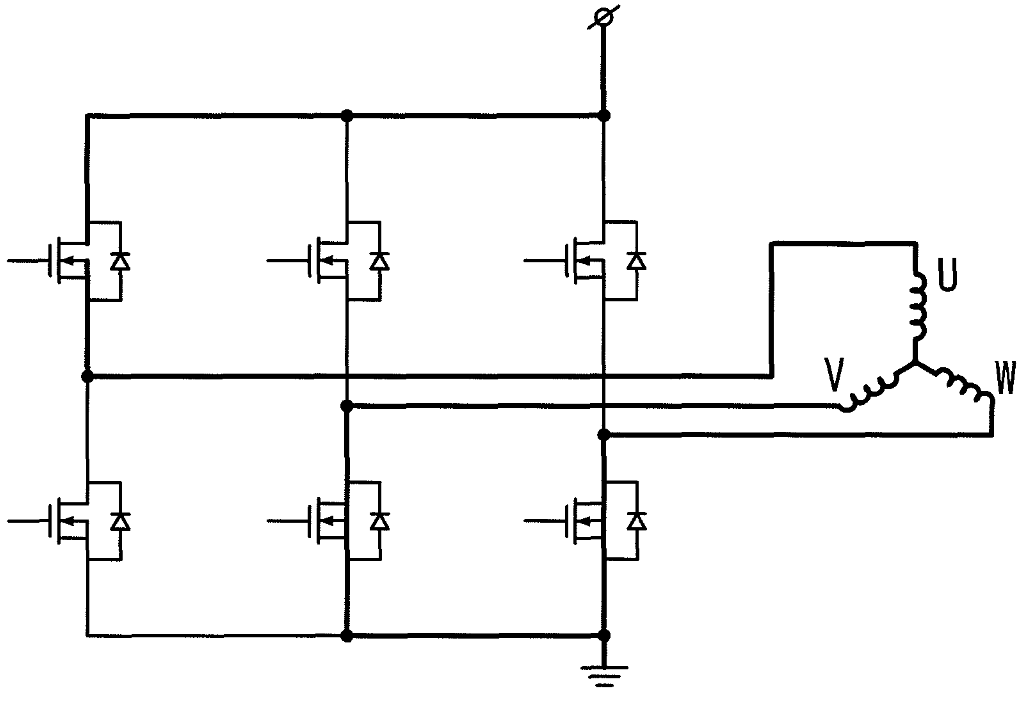
FIG. 7B is a circuit diagram showing an overlapping conduction of said 3-phase brushless motor.
Figure 8:
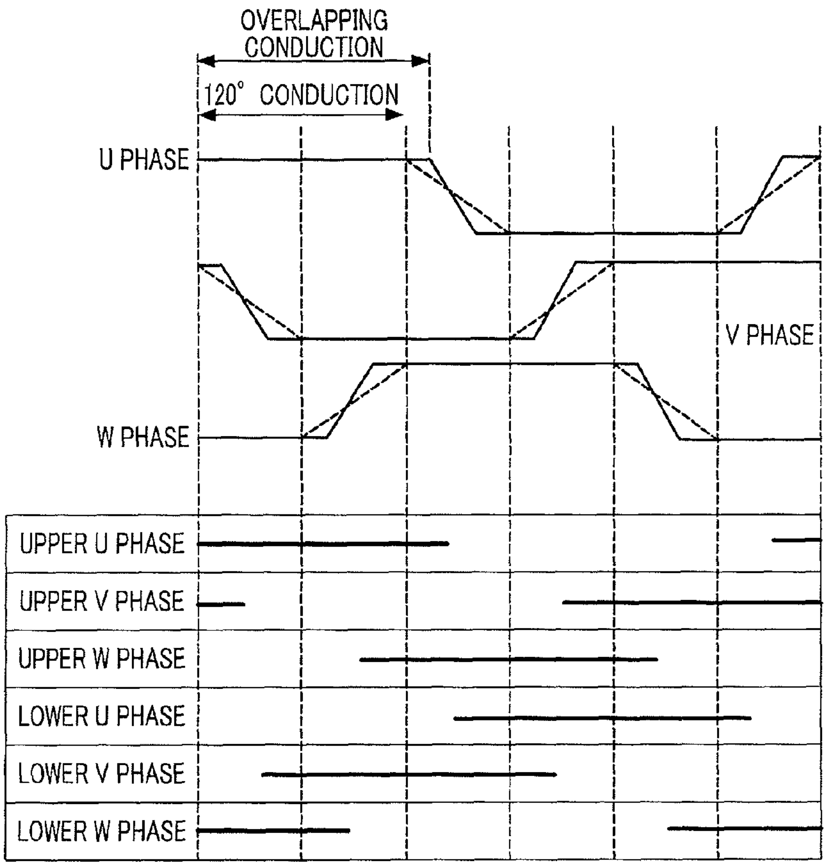
FIG. 8 is a timing diagram showing the 120° conduction and the overlapping conduction of said 3-phase brushless motor.
Figure 9:
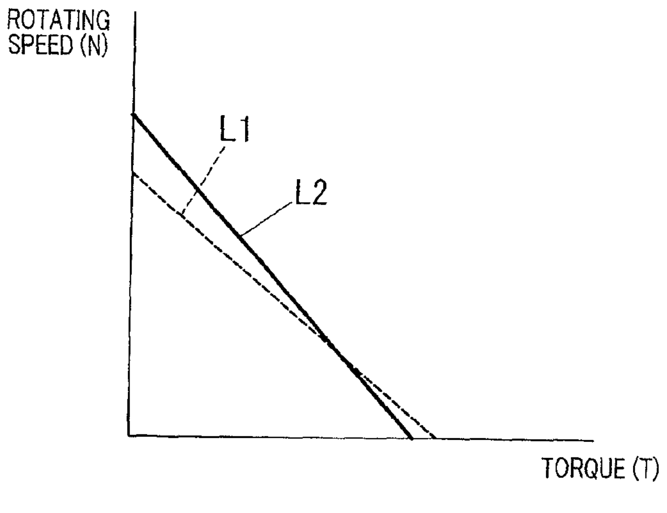
FIG. 9 is an explanatory diagram showing NT characteristics about the 120° conduction and the overlapping conduction.

That is, in regard to the drive of the 3-phase brushless motor, there are a 120° conduction, an overlapping conduction, a sine wave drive, or the like. As shown in FIGS. 7A and 8, the 120° conduction denotes a case where one of upper FETs and one of lower FETs are ON-operated and a current does not flow in one phase of UVW phases. Then, as shown in FIGS. 7B and 8, the overlapping conduction denotes a case where an overlapping period (A current flows in all of UVW phases during this period) is located at each end of commutation and its conducting period is longer than a conducting period of the 120° conduction. The overlapping conduction is closer to an inductive voltage waveform of the motor and the output and efficiency of the motor are improved more, compared with the 120° conduction. Then, the sine wave drive is closer to the inductive voltage waveform of the motor and the output and efficiency of the motor are improved more, compared with the overlapping conduction. Then, FIG. 9 shows a difference of NT characteristics between the 120° conduction (a dashed line L1 in the figure) and the overlapping conduction (a solid line L2 in the figure), and then, near a stalling torque, switching to the 120° conduction leads to a higher output, compared with the overlapping conduction.

Also, through an advance angle control, the output and efficiency of motor M are changed. Then, the output of motor M is improved more in a case where the advance angle is more, compared with a case where there is no advance angle or the advance angle is less. Furthermore, the overlapping conduction has a greater effect than the 120° conduction, through the advance angle control. Then, the sine wave drive has a greater effect than the overlapping conduction, through the advance angle control. Then, the advance angle control itself has been known through, for instance, Japanese Patent Application Laid-Open No. 2003-200363, and therefore will not be explained here.

For this reason, when a battery pack 2 of a high-voltage type has been connected, control circuit CPU of the present embodiment can limit the output of motor M through switching the abovementioned drive method, the conducting angle or the amount of the advance angle, based on the type of the battery pack 2. For instance, when a battery pack 2 of a low-voltage type has been connected, control circuit CPU is configured to switch to the overlapping conduction in which the amount of overlapping (the conducting angle) is more, and to increase the amount of the advance angle more in order to obtain a larger output of motor M. Then, when a battery pack 2 of a high-voltage type has been connected, control circuit CPU is configured to switch to the 120° conduction, or the overlapping conduction in which the amount of overlapping is less, and to change into a state where there is no advance angle or the advance angle is less, in order to obtain a smaller output of motor M. Through such a control, control circuit CPU can bring the output obtained upon the connection of a battery pack 2 of a high-voltage type close to the output obtained upon the connection of a battery pack 2 of a low-voltage type.

When a low load is supplied to motor M, the limitation is not required. Therefore, at this time, control circuit CPU may be configured not to perform the limitation through the overlapping conduction angle control or the advance angle control. Then, control circuit CPU may be configured to perform the limitation through the overlapping conduction angle control or the advance angle control only when a high load is supplied to motor M.

Then, for instance, a table that expresses a relationship between a voltage and a current is previously stored in control circuit CPU. Based on this table, control circuit CPU determines where the present status is in NT characteristics and IT characteristics, and then adds the limitation through the overlapping conduction angle control or the advance angle control, in order to limit a current corresponding to a voltage. Alternatively, a table that expresses a relationship between a rotating speed and a current is previously stored in control circuit CPU, and then, based on this table, control circuit CPU determines where the present status is in NT characteristics and IT characteristics, and then adds the limitation through the overlapping conduction angle control or the advance angle control, in order to limit a current corresponding to a rotating speed.

Figure 10:
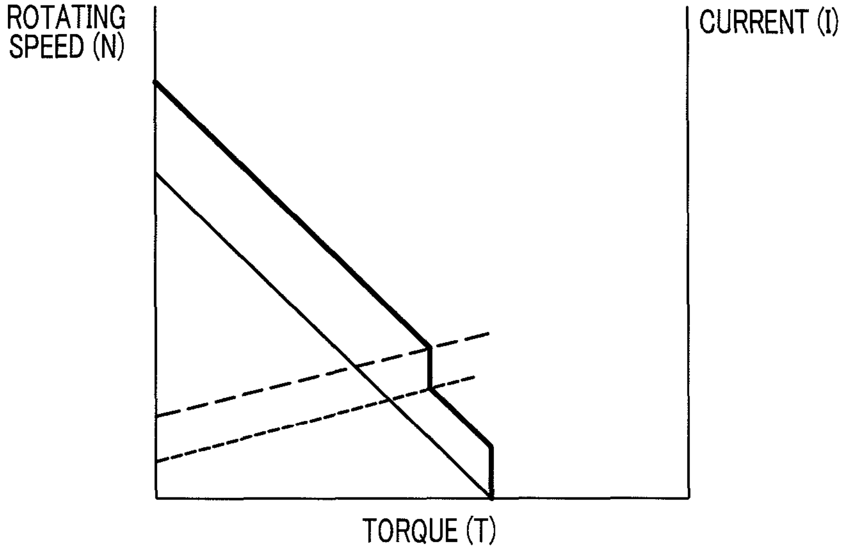
FIG. 10 is an explanatory diagram showing NT characteristics and IT characteristics when said control circuit according to said embodiment of the present invention performs yet another example of output limitation.

Control circuit CPU may be configured to perform the limitation only when the temperature that detected by temperature sensor TS exceeds a predetermined value. FIG. 10 shows a case where control circuit CPU limits the output through the overlapping conduction angle control or the advance angle control in order to inhibit heat release caused by a high load, when a battery pack 2 of a high-voltage type has been connected, and then control circuit CPU stops the output, when the load is increased more.

Preferably, when a battery pack 2 of a high-voltage type is connected and a high load is supplied, the output through the overlapping conduction angle control or the advance angle control is limited so as to be equal to a level of a torque or a current obtained upon the use of a battery pack 2 of a low-voltage type.

The limitations of a load current, an upper limit of a torque and a maximum rotating speed, shown in FIGS. 4, 5 and 6, can be also performed through the overlapping conduction angle control or the advance angle control. As a matter of course, the limitations may be performed only when the temperature is increased.

In any event, even if a battery pack 2 of a high-voltage type is used, the electric tool of the present embodiment can avoid decreases in the safety and the endurance, and moreover can avoid increasing sizes and weights of main unit 1.

Incidentally, when a cell C in a battery pack 2 is, for instance, a nickel-hydrogen cell, a lithium-ion cell or the like being sensitive to overdischarge, main unit 1 is, normally, configured to detect an output voltage of the battery pack 2 at the time of discharge and to stop motor M when the output voltage is reduced to a threshold value, in order to prevent the overdischarge. Here, in the present electric tool, threshold values for all battery packs 2 are stored as a table so that a plurality of battery pack types having different rated output voltages can be used. Then, control circuit CPU is configured to read out, from the table, a threshold value corresponding to a battery pack 2 that has been connected, based on identification information for the type of the battery pack 2, and then, based on the threshold value, to control preventing the overdischarge.

For instance, when a battery pack 2 is provided with three lithium-ion cells and has a rated output voltage of 10.8V, the threshold value for stopping the discharge is set to 7.5V=2.5V*3. When a battery pack 2 is provided with two lithium-ion cells and has a rated output voltage of 7.2V, the threshold value for stopping the discharge is set to 5.0V=2.5V*2.

In this way, the electric tool controls stopping the discharge through using the threshold value corresponding to the type of battery pack 2. Therefore, even when a battery pack 2, having any rated output voltage, is connected, a user can work using only the capacity of the battery pack 2.

Although the present invention has been described with reference to certain preferred embodiments, numerous modifications and variations can be made by those skilled in the art without departing from the true spirit and scope of this invention, namely claims.

The invention claimed is:

1. An electric tool comprising:

a removable battery pack as a power supply;

a motor as a power source;

a drive unit being driven by said motor;

a switch as an operation input unit; and a control circuit controlling driving of said motor according to the operation of said switch, wherein the electric tool comprises:

a power supply connection unit that enables a plurality of battery pack types, which have different rated output voltages, to be selectively connected; and an identification means that identifies the type of said battery pack that has been connected, and wherein said control circuit is configured to control an output of said motor based on identification information for the type of said battery pack that has been connected, provided by said identification means.

2. The electric tool as claimed in claim 1, wherein said control circuit is configured not to limit the output of said motor, when the identification information for the type of said battery pack that has been connected denotes a low-voltage type, and wherein said control circuit is configured to limit the output of said motor, when the identification information for the type of said battery pack that has been connected denotes a high-voltage type.

3. The electric tool as claimed in claim 1, further comprising a load detection means that detects a load of said motor, wherein said control circuit is configured to limit the output of said motor, when the identification information for the type of said battery pack that has been connected denotes a high-voltage type and a high-load is detected by said load detection means.

4. The electric tool as claimed in claim 3, wherein said control circuit is configured to limit the output of said motor, that is provided when the high-load is detected, to an output of said motor, that is provided when the identification information for the type of said battery pack that has been connected denotes a low-voltage type.

5. The electric tool as claimed in claim 1, wherein said control circuit is configured to limit a rotating speed of said motor to a predetermined value or less when the identification information for the type of said battery pack that has been connected denotes a high-voltage type.

6. The electric tool as claimed in claim 1, wherein said motor is a brushless motor, and wherein said control circuit is configured to limit the output of said motor by means of changing at least one of an overlapping conduction angle and an advance angle upon drive of said motor.

7. The electric tool as claimed in claim 2, further comprising a load detection means that detects a load of said motor, wherein said control circuit is configured to limit the output of said motor, when the identification information for the type of said battery pack that has been connected denotes the high-voltage type and a high-load is detected by said load detection means.

8. The electric tool as claimed in claim 2, wherein said motor is a brushless motor, and wherein said control circuit is configured to limit the output of said motor by means of changing at least one of an overlapping conduction angle and an advance angle upon drive of said motor.

* * * * *